Patented Sept. 4, 1923.

1,467,024

UNITED STATES PATENT OFFICE.

EINAR BERGVE, OF CHRISTIANIA, NORWAY.

TOOTH PASTE.

No Drawing.    Application filed December 14, 1922.   Serial No. 606,975.

*To all whom it may concern:*

Be it known that I, EINAR BERGVE, a subject of the King of Norway, residing at and whose address is Rosenborggate 4, Christiania, Norway, have invented certain new and useful Improvements in Tooth Paste; and I do hereby declare the following to be a full, clear, and exact description of the invention, such as will enable others skilled in the art to which it appertains to make and use the same.

As a vehicular mass in tooth pastes there is usually employed a mixture of substances substantially consisting of carbonic acid salts in various proportions. As generally employed constituents, may be mentioned carbonate of lime as in precipitated condition or consisting of finely pulverized mussel shells, and magnesium carbonate; and as a polishing means pumice stone, finely pulverized kieselguhr, etc. The mixtures are usually brought into a plastic condition by a suitable addition of glycerine and medicinal soaps and sometimes also of honey and rice starch. The vehicular mass of these known tooth pastes therefore owing to the contained carbonates and soap are strongly alkaline and this property of the paste is even by several manufacturers praised as a means to neutralize the acids of the mouth and to preserve the teeth.

The modern research in this field has ascertained however, that the alkaline tooth pastes (or liquid dentifrices) are of no value in this respect. On the contrary this type of pastes act against their purpose. On the first hand it is obvious that neutralization effected twice a day in the course of few minutes is quite illusory. The point of the greatest importance in this case however is, that it has been clearly shown, that alkaline substances act as depreciators upon the alkaline secretion of the salivary glands. The total quantity of saliva as well as the alkalinity of the same becomes reduced.

It is an important problem therefore to produce a tooth paste having a ground mass, base or vehicle which is active as a mechanical cleansing means for the teeth but which is physiologically indifferent or if possible in possession of a stimulating influence upon the secretion of saliva, because this secretion represents the best protection of the teeth. It is necessary therefore to avoid the use of medicinal soaps, glycerine and carbonates.

The present invention has for its object a tooth paste which complies with the requirements as above indicated. This tooth paste contains substances of acid character such as organic acids or their salts incorporated into a silica jelly. By the use of silica jelly as a vehicular substance the use of glycerine as a constituent of the tooth paste can be wholly or to the greater part dispensed with. This is of considerable importance because the use of such a strongly hygroscopic substance as glycerine in the concentration required in tooth pastes presents a disadvantage. The fact is that the prevailing opinion among professional men is that the glycerine exerts an injurious effect upon the gums which readily bleed by brushing especially in pyorrhoic patients. In the production of tooth paste according to the present invention the silica jelly is preferably employed in a condition in which it contains a large proportion of water or alcohol. A colloidal silica containing about 90 per cent of water has for example been found to be very suitable. Together with a mineral abradant or polishing substance in a quantity (of for example 10 per cent) such a highly hydrous silica will produce a paste of a consistency suitable for the filling of tubes.

The acid substances such as tartaric acid and other organic acids such as citric acid, lactic acid and their acid salts (more especially potassium salts), etc., incorporated in the silica jelly become dissolved in the water of the jelly and will therefore exert their action in the correct concentration immediately when the paste is applied.

In the usual glycerine bearing pastes the tartaric acid as known must be incorporated into the paste as crystals and owing to the slow solubility of the tartaric acid it will exert its action too late.

When it is desired to increase the viscosity of the silica jelly employed as a ground mass of the paste this is suitably effected by the addition of amorphous titanic acid ($TiO_2$) to the jelly. The titanic acid will act as a binding agent which imparts a viscid or plastic consistency to the paste.

The silica jelly may be employed as a hydro paste or wholly or partially as an alcoholic paste. As an example may be mentioned, that a silica paste containing 80-90 per cent $C_2H_5OH$ has a suitable consistency.

Besides the advantages referred to above the use of silica jelly as a vehicular substance of tooth pastes has the advantage of allowing the added flavoring substances to retain their characteristic flavor.

In the production of acid tooth pastes according to the present invention silicates or other substances which are not acted upon by acids should be made use of as an abrading agent. The degree of hardness of the grinding substance should not be above 5.

The following is an example of the composition of a tooth paste produced according to the invention.

65 parts by weight of silica jelly containing 10 per cent of silica.

10 parts by weight of anhydrous titanic acid ($TiO_2$).

18 parts by weight of abradant.

2 parts by weight gummi arabicum.

5 parts by weight potassium bitartrate.

Claims:
1. Tooth paste comprising a substance of an acid character and a silica jelly.

2. Tooth paste comprising titanic acid and a silica jelly.

3. Tooth paste comprising a substance of an acid character incorporated into a silica jelly and an abradant which is not acted upon by the said acid substance.

4. Process for the production of a tooth paste which comprises incorporating substance of an acid character into a silica jelly.

5. A tooth paste comprising a hydrated substance in gelatinous form acting as a base for the paste and rendered viscous by an anhydrous metal acid capable of maintaining the viscosity of such base substance.

In testimony that I claim the foregoing as my invention, I have signed my name in presence of two subscribing witnesses.

EINAR BERGVE.

Witnesses:
DAGNY SYVERSEN,
MOGEUS BERGVE.